United States Patent
Lee et al.

(10) Patent No.: US 8,217,768 B2
(45) Date of Patent: Jul. 10, 2012

(54) VIDEO REPRODUCTION APPARATUS AND METHOD FOR PROVIDING HAPTIC EFFECTS

(75) Inventors: Ho-Jin Lee, Suwon-si (KR);
Young-Min Lee, Yongin-si (KR);
Shi-Yun Cho, Anyang-si (KR);
Ho-Seong Seo, Suwon-si (KR);
Youn-Ho Choi, Seoul (KR); Ji-Hyun Jung, Gwangju-si (KR)

(73) Assignee: Samsung Electronics Co., Ltd (KR)

( * ) Notice: Subject to any disclaimer, the term of this patent is extended or adjusted under 35 U.S.C. 154(b) by 549 days.

(21) Appl. No.: 12/498,683

(22) Filed: Jul. 7, 2009

(65) Prior Publication Data
US 2010/0007475 A1 Jan. 14, 2010

(30) Foreign Application Priority Data
Jul. 9, 2008 (KR) .................. 10-2008-0066516

(51) Int. Cl.
*H04B 3/36* (2006.01)

(52) U.S. Cl. .................. 340/407.1; 340/407.2
(58) Field of Classification Search .............. 340/407.1, 340/407.2
See application file for complete search history.

(56) References Cited

U.S. PATENT DOCUMENTS

| | | | |
|---|---|---|---|
| 7,911,328 B2* | 3/2011 | Luden et al. .............. | 340/407.1 |
| 2009/0128306 A1* | 5/2009 | Luden et al. .............. | 340/407.1 |
| 2009/0322498 A1* | 12/2009 | Yun et al. .................. | 340/407.2 |
| 2011/0025480 A1* | 2/2011 | Hwang et al. ............. | 340/407.1 |
| 2011/0032088 A1* | 2/2011 | Kim et al. .................. | 340/407.1 |

* cited by examiner

*Primary Examiner* — Travis Hunnings
(74) *Attorney, Agent, or Firm* — The Farrell Law Firm, P.C.

(57) ABSTRACT

An apparatus and method for allowing a user to dynamically enjoy a video. A difference between image data is computed at every preset unit of time and a vibration corresponding to the computed difference is generated so that the user can sense a motion change of an object within the video. Upon video reproduction, scenes are displayed by applying the lighting effect of a strobe light or the like between the scenes to be reproduced. Upon video reproduction, more enjoyment and various haptic effects can be provided to the user.

12 Claims, 5 Drawing Sheets

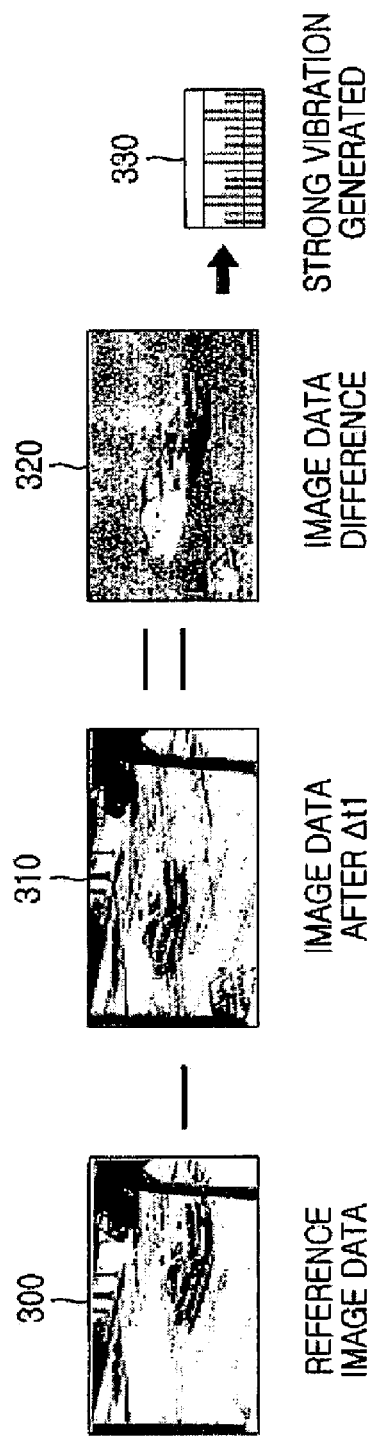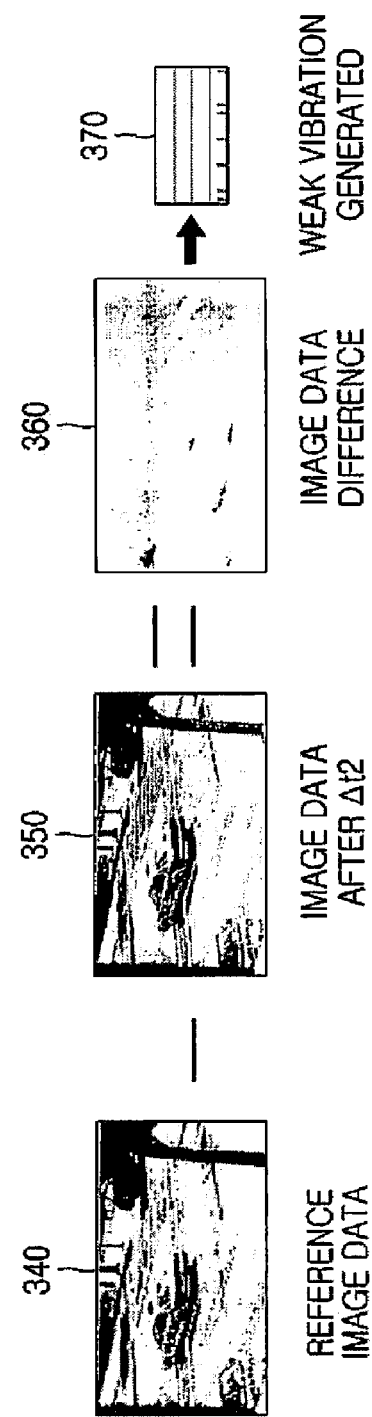
FIG.3A
FIG.3B

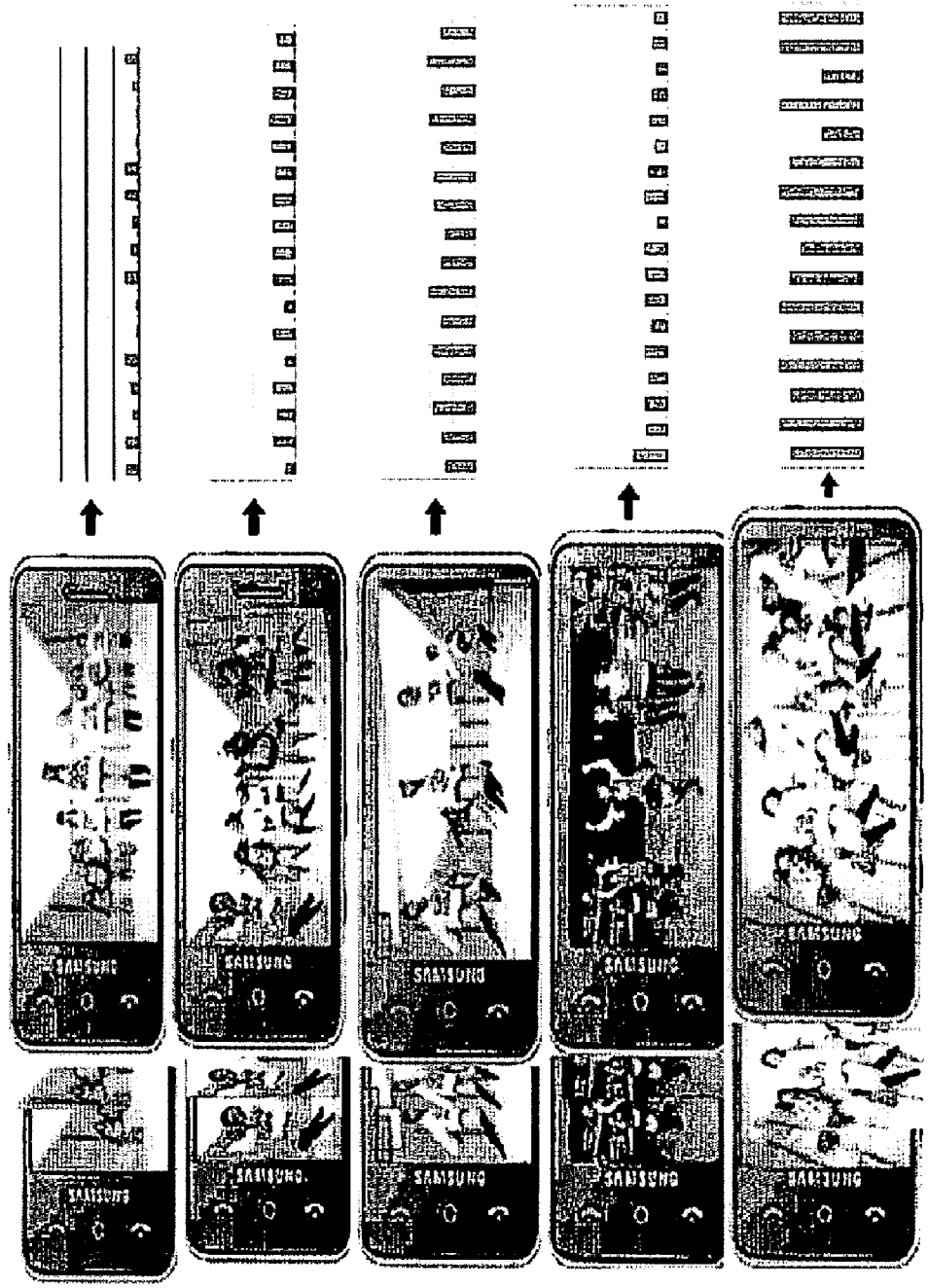

VIDEO REPRODUCTION APPARATUS AND METHOD FOR PROVIDING HAPTIC EFFECTS

PRIORITY

This application claims priority under 35 U.S.C. §119(a) to a Korean Patent Application filed in the Korean Intellectual Property Office on Jul. 9, 2008 and assigned Serial No. 10-2008-66516, the contents of which is incorporated herein by reference.

BACKGROUND OF THE INVENTION

1. Field of the Invention

The present invention relates generally to a video reproduction apparatus and method, and in particular, to a video reproduction apparatus and method for allowing a user to dynamically enjoy a video upon video reproduction.

2. Description of the Related Art

At present, mobile terminals are adopting many additional functions to increase the convenience or efficiency for users. As an example of the additional functions, three-dimensional sound effect to which spatial information is added is provided in a mobile terminal so that the directional perception and distance perception are possible when a user listens to sound. Accordingly, the user may rhythmically sense the three-dimensional sound effect according to music sound while listening to music in a mobile terminal such as a mobile phone, MPEG-1 Audio Layer 3 (MP3) player, or the like. When the user views a video such as a music video or the like through a screen of the mobile terminal, the user may sense the motion of singers and sound according to the motion through the screen. However, the mobile terminals have no means for allowing the users to receive other sensory inputs according to dance movement or stage sound when singers dance.

As described above, only a simple image or video is conventionally displayed on the mobile terminal screen. Unfortunately, the sound and motion alone of a character or object within the video may not sufficiently transfer a sense according to an image change displayed on the mobile terminal. That is, the user may not sufficiently sense the image change.

SUMMARY OF THE INVENTION

When an image change is dynamically expressed and sensed upon video reproduction in the mobile terminal, various user desires may be satisfied.

An aspect of the present invention is to address at least the problems and/or disadvantages described above and to provide at least the advantages described below. Accordingly, an aspect of the present invention is to provide a video reproduction apparatus and method that can allow a user to dynamically enjoy a video upon video reproduction.

Also, an aspect of the present invention is to provide a video reproduction apparatus and method that can provide a user with a sense according to an image change upon video reproduction.

According to an aspect of the present invention, there is provided a video reproduction apparatus for providing haptic effects, the apparatus including a display unit that displays image data according to video reproduction; an image-data extraction unit that extracts reference image data and image data after a given time from a video at every preset period of time; a difference computation unit that computes a difference between the reference image data and the image data after the given time; a vibration-magnitude setting unit that sets vibration magnitude corresponding to the computed difference; and a vibration generation unit that generates a vibration corresponding to the set vibration magnitude.

According to an aspect of the present invention, there is provided a method for providing haptic effects in a video reproduction apparatus, the method including displaying image data according to video reproduction; extracting reference image data and image data after a given time from a video at every preset unit time; computing a difference between the reference image data and the image data after the given time; setting vibration magnitude corresponding to the computed difference; and generating a vibration corresponding to the set vibration magnitude.

BRIEF DESCRIPTION OF THE DRAWINGS

The above and other aspects, features and advantages of the present invention will become more apparent from the following detailed description when taken in conjunction with the accompanying drawings in which:

FIGS. 3A and 3B illustrate a method for computing a difference between two image data according to the first embodiment of the present invention;

FIGS. 4A to 4E illustrate vibration magnitudes mapped to image changes according to the first embodiment of the present invention;

Throughout the drawings, the same drawing reference numerals will be understood to refer to the same elements, features and structures.

DETAILED DESCRIPTION OF EXEMPLARY EMBODIMENTS

Figure 1:
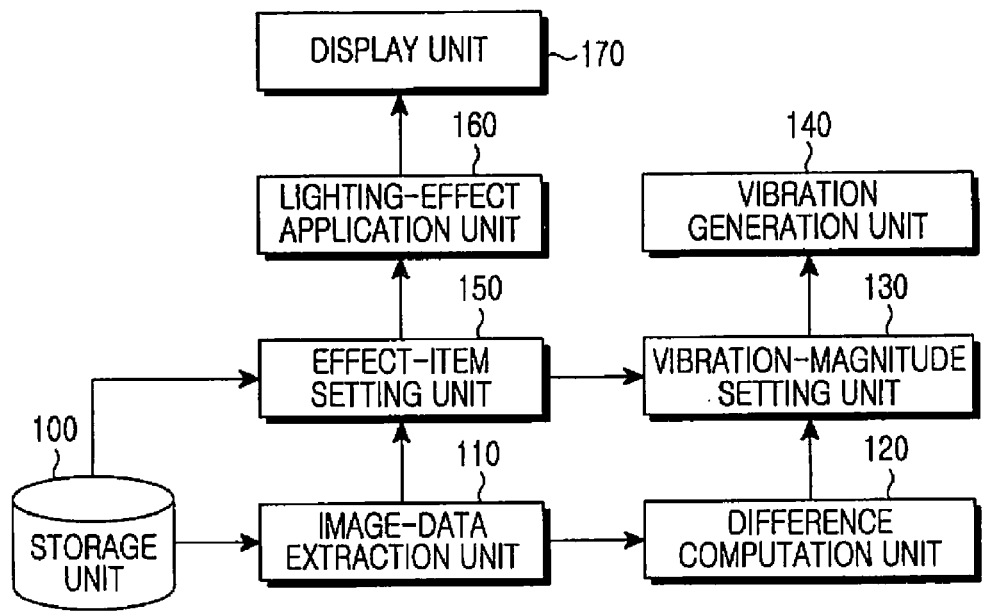
FIG. 1 is a block diagram illustrating a video reproduction apparatus for providing haptic effects according to an embodiment of the present invention.

Embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Embodiments of the present invention provide an apparatus and method that can allow a user to dynamically enjoy a video. Specifically, an embodiment of the present invention is characterized in that a difference between image data is computed at every preset unit of time and a vibration corresponding to the computed difference is generated so that the user can sense a motion change of an object within the video. Also, an embodiment of the present invention is characterized in that scenes are displayed by applying the lighting effect of a strobe light or the like between the scenes to be reproduced upon video reproduction. Accordingly, upon video reproduction, more enjoyment and various haptic effects can be provided to the user.

The operation of a video reproduction apparatus in which the above-described functions are implemented will be described with reference to FIG. 1, which is a block diagram illustrating a video reproduction apparatus for providing haptic effects according to an embodiment of the present invention.

Referring to FIG. 1, the video reproduction apparatus includes a storage unit 100, an image-data extraction unit 110, a difference computation unit 120, a vibration-magnitude setting unit 130, a vibration generation unit 140, an effect-item setting unit 150, a lighting-effect application unit 160, and a display unit 170. Of course, when the video reproduction apparatus is a portable phone capable of reproducing a video, additional elements, for example, a transmission unit, etc., may be further included according to other functions, but as they are not directly related to the present invention, their descriptions are omitted.

First, the storage unit 100 stores a plurality of videos. The storage unit 100 stores effect items such as vibration effect, lighting effect of a strobe light, on/off effect of lighting elements, etc. so that various haptic effects can be provided. In particular, to apply the vibration effect item to the video, the storage unit 100 stores mapping information between a difference of image data per unit time and vibration magnitude corresponding thereto.

The image-data extraction unit 110 extracts image data per preset unit of time. Specifically, when the user selects a video, the image-data extraction unit 110 extracts reference image data from the video and then extracts image data after Δt. Here, image data to be extracted per unit of time may be one or more frames or scenes.

When the reference image data and the image data after Δt are output from the image-data extraction unit 110, the difference computation unit 120 computes a difference between the two image data. An operation for computing the difference between the two image data will be described with reference to FIGS. 3A and 3B. FIG. 3A illustrates an example in which residual image data 320 is output when subtracting image data 310 after Δt1 from reference image data 300. Also, FIG. 3B illustrates an example in which residual image data 360 is output when a difference between two image data 340 and 350 is computed. Here, the residual image data 360 is less than the residual image data 320 of FIG. 3A. This indicates that the difference between the two image data 340 and 350 of FIG. 3B is less than that between the two image data 300 and 310.

For example, a large image data difference 320 is computed when a motion change of an object, such as a car, within the video of FIG. 3A is large, and a small image data difference 360 is computed when a motion change of a car within the video of FIG. 3B is small. As described above, the residual image data indicates a difference between two image data. A middle gray color of the image data 320 indicates that a pixel value difference between two image data, that is, a color value difference when the two image data overlap, is "0". A bright gray color corresponds to a positive integer and a dark gray color corresponds to a negative integer. One example of a technology for computing an image data difference has been described above, but the present invention is not limited thereto.

The vibration-magnitude setting unit 130 sets vibration magnitude corresponding to an image data difference computed by the difference computation unit 120. The vibration-magnitude setting unit 130 sets the vibration magnitude by referring to mapping information between the vibration magnitude and the difference stored in the storage unit 100. Accordingly, the vibration magnitude is set to generate a strong vibration as indicated by reference numeral 330 when the image data difference is large as illustrated in FIG. 3A, and set to generate a weak vibration as indicated by reference numeral 370 when the image data difference is small as illustrated in FIG. 3B.

The vibration generation unit 140 is a vibrator which generates a vibration according to vibration magnitude set by the vibration-magnitude setting unit 130. Accordingly, the user can feel a realistic sense via his/her fingertips when a singer dances in a video while viewing the video, such as a music video, or the like, and listening to music, and can dynamically enjoy the video since the user can feel the vibration strength which varies according to a motion change.

The effect-item setting unit 150 sets a type of effect item to be applied upon video reproduction. Accordingly, when the user inputs selection to sense a motion change of an object within an image, the effect-item setting unit 150 sets a vibration effect item as an effect item. The effect-item setting unit 150 can retrieve mapping information from the storage unit 100 and provide the retrieved mapping information to the vibration-magnitude setting unit 130. On the other hand, when the user makes a selection to visually sense a motion change, an item of a strobe lighting effect, light on/off effect, or the like, is selected.

When the lighting effect such as strobe lighting effect, light on/off effect, or the like is selected, the lighting-effect application unit 160 sets a video reproduction time interval, a reproduction time, and the number of frames corresponding to the reproduction time so as to visually provide a motion change. Here, the reproduction time interval can be automatically set according to a music period and set as a user controlled period. In the same manner, the number of frames can be set. When the reproduction time interval and the number of frames are set, the lighting-effect application unit 160 applies the lighting effect to frames corresponding to the reproduction time. To apply the lighting effect to the frame itself, blackout, image inversion, luminance control, etc. can be used. In an embodiment of the present invention, the lighting effect is referred to as the strobe lighting effect.

The lighting-effect application unit 160 can output the lighting effect by turning on/off a lighting element such as a Light Emitting Diode (LED), a flashlight, or the like, at the reproduction time interval without applying the lighting effect to the frame itself. In an embodiment of the present invention, the strobe lighting effect and the lighting effect using the lighting element have been illustrated, but the present invention is not limited thereto. That is, various lighting effects can be applied according to selection of the user, a service provider, a terminal manufacturer, etc. According to an embodiment of the present invention, the lighting effect can be created by the user and changed according to the user's selection by receiving a type of content through a content provider, etc. That is, content of the lighting effect can be provided in various forms.

The display unit 170 displays image data according to video reproduction selected by the user. When the reproduction time interval and the number of frames are set by the lighting-effect application unit 160, the display unit 170 displays a given number of frames, cut-by-cut, in a sliding manner, during a reproduction time, and displays the frames to which the strobe lighting effect has been applied during the reproduction time. Since a given number of frames are viewed in every reproduction time upon video reproduction, the user can have a feeling as if still images are viewed in sequence. Since the frames to which the strobe lighting effect has been applied are displayed during the reproduction time, the user can have a feeling as if in a discotheque. At this time, the vibration generation unit 140 generates a vibration according to an image change and simultaneously the display unit 170 displays scenes to which the above-described lighting effect has been applied.

In the following description, embodiments of the present invention are divided as follows.

A first embodiment of the present invention relates to a process for computing a difference between two image data per unit time extracted from a video and then generating a vibration corresponding to the computed difference so as to provide the user with haptic effects according to a motion change within a scene. A second embodiment of the present invention relates to a process for displaying a scene to which lighting effect has been applied upon video reproduction or turning on/off a lighting element therebetween. The embodiments of the present invention can be divided as described above, but, of course, it is possible to generate a vibration according to an image change and simultaneously display an image to which visual lighting effect has been applied.

The first exemplary embodiment of the present invention will be described with reference to FIG. 2, which is a flowchart illustrating an operation for generating a vibration based on an image change according to the first embodiment of the present invention. In the following, a description is given using an example of FIGS. 4A to 4E, but a haptic-effect providing method according to an embodiment of the present invention is not limited thereto.

Figure 2:
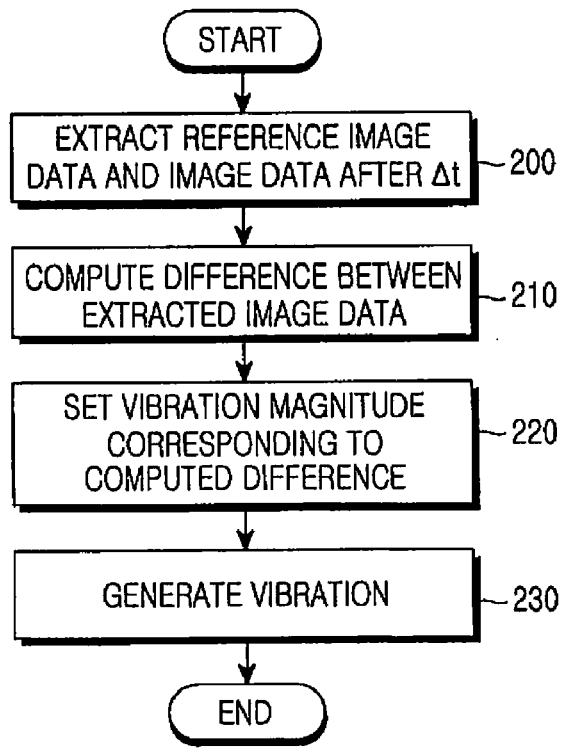
FIG. 2 is a flowchart illustrating an operation for generating a vibration based on an image change according to a first embodiment of the present invention.

Referring to FIG. 2, when the user selects a video to be reproduced, the video reproduction apparatus extracts reference image data per preset unit of time and image data after Δt from the video in step 200. Subsequently, the video reproduction apparatus computes a difference between the extracted two image data in step 210 and sets vibration magnitude corresponding to the computed difference in step 220. Accordingly, a vibration corresponding to the vibration magnitude is generated in step 230. As the image data difference, that is, the image change, increases, the strength of vibration increases.

FIGS. 4A and 4B illustrate an example in which a weak vibration is generated according to time-specific decoding data of the screen. It can be seen that a relatively increased vibration is generated in the motion change of FIG. 4B which is greater than that of FIG. 4A. As the motion change is greater than before as illustrated in FIG. 4C, the vibration increases. When the motion change is small as illustrated in FIG. 4D, the vibration decreases. As illustrated in FIG. 4E, a very strong vibration is generated by a fast screen change such as an increased motion change according to a jumping movement of the performers in the video.

Figure 5:
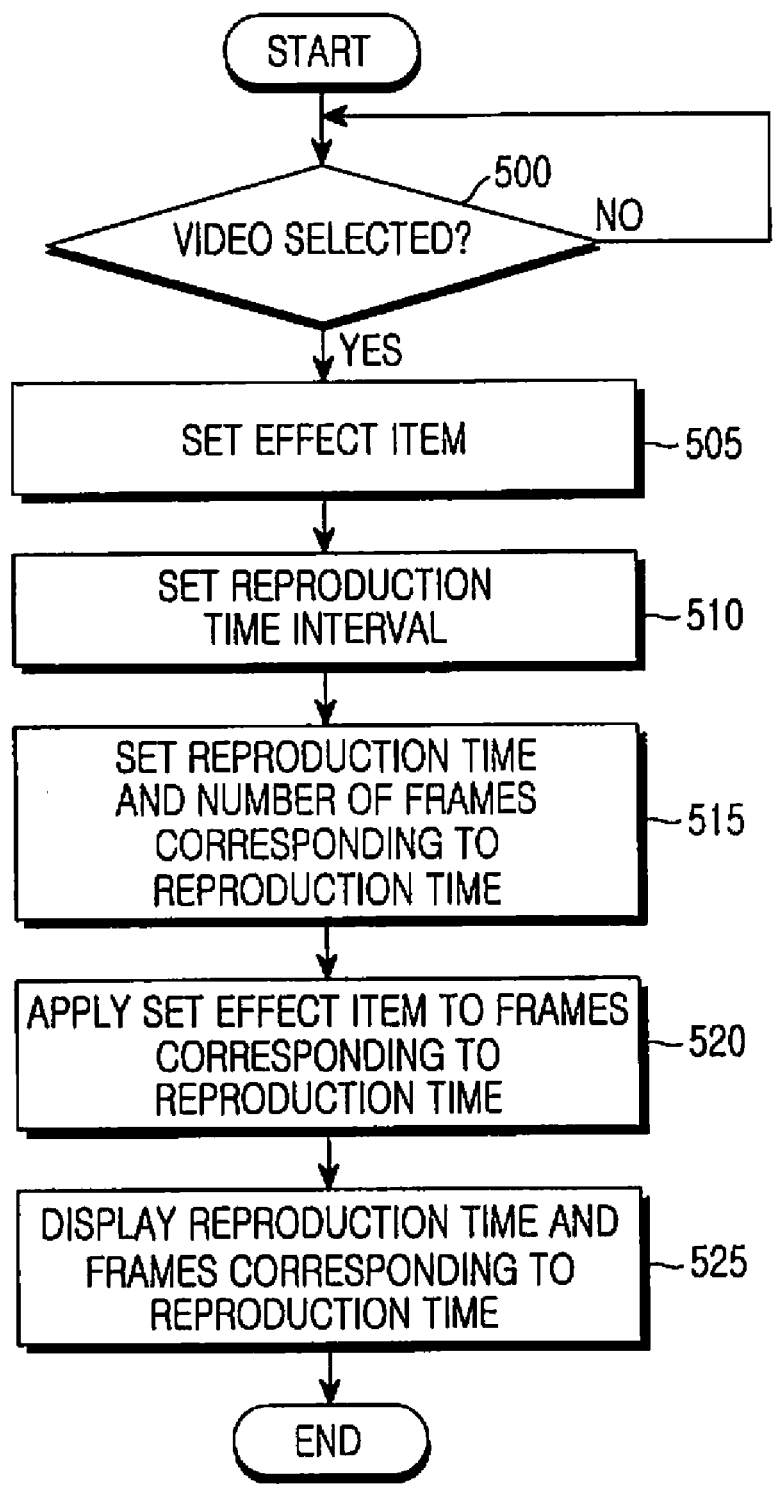
FIG. 5 is a flowchart illustrating an operation for outputting lighting effect in every video reproduction time according to a second embodiment of the present invention.
Figure 6:
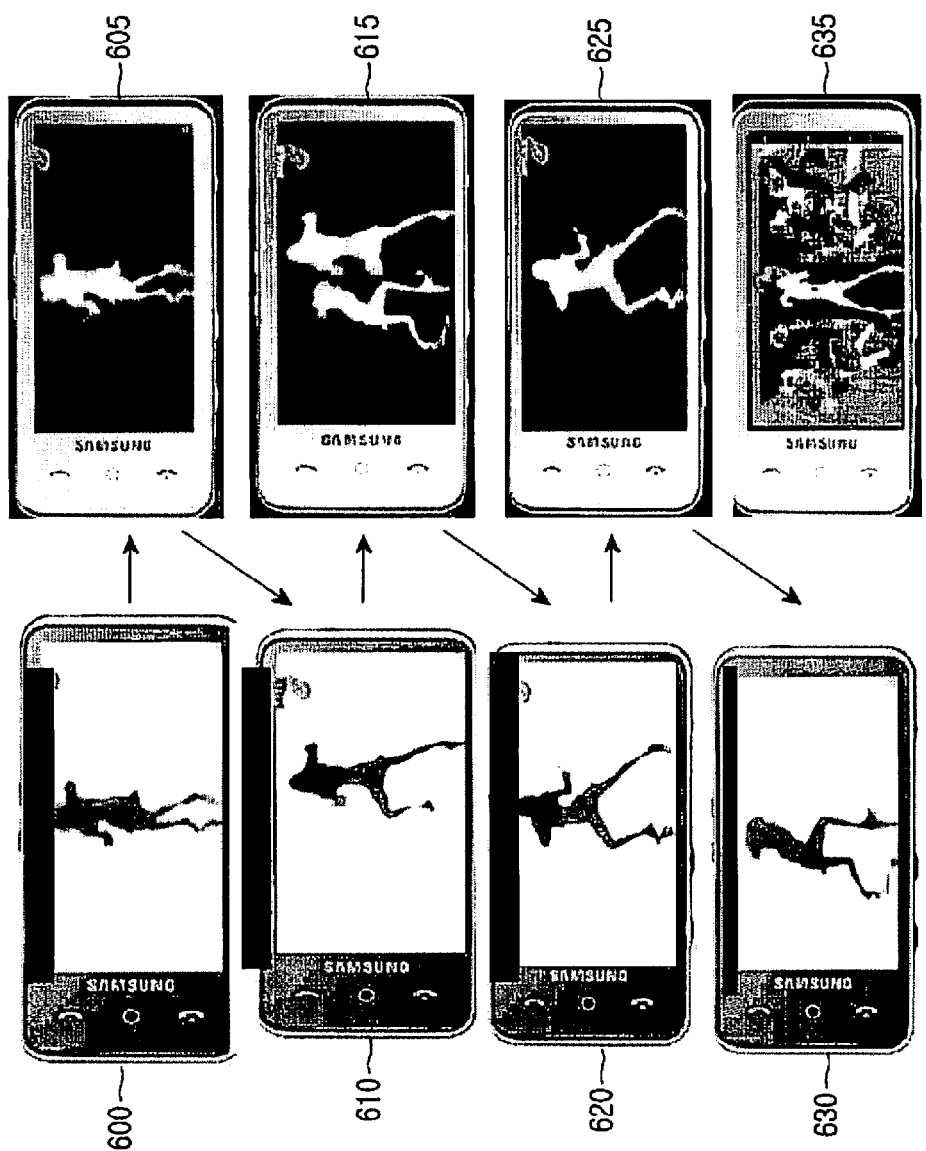
FIG. 6 is an example of a screen on which frames to which the lighting effect has been applied are displayed according to the second embodiment of the present invention.

A process for outputting the lighting effect in every video reproduction time according to the second embodiment of the present invention will be described with reference to FIG. 5. Here, a description is given using an example of FIG. 6, but a haptic-effect providing method according to an embodiment of the present invention is not limited thereto.

First, the video reproduction apparatus determines whether the user selects a video to be reproduced in step 500. When the video is selected as the determination result, an effect item is set in step 505. At this time, an example of selecting strobe lighting effect as the effect item in FIG. 5 is described. To output the strobe lighting effect upon video reproduction, one of blackout, image inversion, and luminance control is applied to at least one frame corresponding to a given time interval at which the video is reproduced. At this time, only a given number of frames are sequentially displayed, one-by-one, in a video reproduction time and frames to which the strobe lighting effect has been applied are displayed during the time interval. When a scene to which the lighting effect has been applied is viewed while several frames are viewed in the video reproduction time, the user can view the scene to which the lighting effect has been applied while having a feeling as if still scenes are viewed continuously. Accordingly, the user can have a feeling as if viewing a brilliant light in a discotheque The video reproduction apparatus sets a video reproduction time interval in step 510. Subsequently, the video reproduction apparatus sets a reproduction time and the number of frames corresponding to the reproduction time in step 515. Then, the video reproduction apparatus applies the set effect item to the frames corresponding to the reproduction time in step 520. As an example of displaying scenes to which the effect item has been applied, one of a scene processed in black, a low-luminance scene, and an inverted image scene as indicated by reference numerals 605, 615, 625, and 635 of FIG. 6 can be displayed. Accordingly, a reproduction time and frames corresponding to the reproduction time are sequentially and continuously displayed in step 525. For example, an inverted image scene as indicated by reference numeral 605 is displayed after a dancing scene is displayed in the reproduction time as indicated by reference numeral 600 of FIG. 6. Subsequently, a scene as indicated by reference numeral 610 is displayed, and a scene as indicated by reference numeral 615 is displayed in the next reproduction time. Scenes as indicated by reference numerals 620, 625, 630, and 635 can be displayed continuously. At this time, the above-described lighting effect can be expected by speedily flickering a lighting element while sequentially displaying the scenes.

According to the embodiments of the present invention as described above, a user can feel a realistic sense via his/her fingertips when a singer dances in a video reproduced along with music, and can have more enjoyment and various haptic effects along with a vibration by displaying a scene to which lighting effect has been applied.

According to the embodiments of the present invention, a video can be viewed dynamically by providing a user with a sense according to an image change upon video reproduction in a mobile terminal. According to the embodiments of the present invention, the user can feel a realistic sense of a moving object upon video reproduction by transferring a vibration to the user, and can feel a realistic spatial sense by transferring a motion-based vibration to the user. According to the embodiments of the present invention, more enjoyment and various haptic effects can be provided to the user by applying the lighting effect of a strobe light, etc. between scenes to be reproduced upon video reproduction.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A video reproduction apparatus for providing haptic effects, comprising:
   a display unit for displaying image data according to video reproduction;
   an image-data extraction unit for extracting reference image data and image data after a given point in time from a video at every preset unit of time;
   a difference computation unit for computing a difference between the reference image data and the image data after the given point in time;

a vibration-magnitude setting unit for setting vibration magnitude corresponding to the computed difference; and a vibration generation unit for generating a vibration corresponding to the vibration magnitude during the video reproduction.

2. The video reproduction apparatus of claim 1, further comprising:

a lighting-effect application unit for setting a video reproduction time interval when a lighting effect to be applied upon video reproduction is selected, and applying the lighting effect to frames corresponding to a reproduction time.

3. The video reproduction apparatus of claim 2, wherein the display unit displays a given number of video frames during the reproduction time and displays frames to which the lighting effect has been applied during the reproduction time.

4. The video reproduction apparatus of claim 2, wherein the lighting effect is one of blackout, image inversion, and luminance control.

5. The video reproduction apparatus of claim 3, wherein the lighting effect is one of blackout, image inversion, and luminance control.

6. The video reproduction apparatus of claim 2, wherein the lighting-effect application unit outputs the lighting effect by turning on/off a lighting element mounted in the video reproduction apparatus at the video reproduction time interval.

7. A method for providing haptic effects in a video reproduction apparatus, comprising the steps of:

displaying image data according to video reproduction;

extracting reference image data and image data after a given point in time from a video at every preset unit of time;

computing a difference between the reference image data and the image data after the given point in time;

setting vibration magnitude corresponding to the computed difference; and generating a vibration corresponding to the vibration magnitude during the video reproduction.

8. The method of claim 7, further comprising:

setting a video reproduction time interval when a lighting effect to be applied upon video reproduction is selected; and applying the lighting effect to frames corresponding to a reproduction time.

9. The method of claim 8, wherein a given number of video frames are displayed during the reproduction time and frames to which the lighting effect has been applied are displayed during the reproduction time.

10. The method of claim 8, wherein the lighting effect is one of blackout, image inversion, and luminance control.

11. The method of claim 9, wherein the lighting effect is one of blackout, image inversion, and luminance control.

12. The method of claim 7, further comprising:

setting a video reproduction time interval when a lighting effect to be applied upon video reproduction is selected; and outputting the lighting effect by turning on/off a lighting element mounted in the video reproduction apparatus at the video reproduction time interval.

* * * * *